(12) United States Patent
Ashwood-Smith (10) Patent No.: US 7,366,109 B2
(45) Date of Patent: Apr. 29, 2008

(54) VIRTUAL PRIVATE NETWORKS WITHIN A PACKET NETWORK HAVING A MESH TOPOLOGY

(75) Inventor: Peter Ashwood-Smith, Gatineau (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 952 days.

(21) Appl. No.: 10/694,833

(22) Filed: Oct. 29, 2003

(65) Prior Publication Data

US 2005/0094577 A1    May 5, 2005

(51) Int. Cl.
*H04L 12/28* (2006.01)
(52) U.S. Cl. ...................... 370/254; 709/223
(58) Field of Classification Search ............... 709/223, 709/225–226, 238–245, 251
See application file for complete search history.

(56) References Cited

U.S. PATENT DOCUMENTS 6,202,082 B1 * 3/2001 Tomizawa et al. .......... 709/201
6,490,693 B1 * 12/2002 Briskey et al. ............... 714/15

OTHER PUBLICATIONS

E. Rosen, Y. Rekhter, RFC 2547 "BGP/MPLS VPNs", Mar. 1999, The Internet Society, 25 pages.*

* cited by examiner

*Primary Examiner*—Ario Etienne
*Assistant Examiner*—Michael C Lai
(74) *Attorney, Agent, or Firm*—Ridout & Maybee LLP (57) ABSTRACT

A method of creating virtual private networks within a packet network having a mesh topology. A flexible virtual private network is established based upon a topology calculated at each member node. The network is set up using label switched paths between adjacent member nodes according to the topology. The topology may be a ring or a tree. A virtual ring is created as a closed-loop sequence of label switched paths established between a set of member nodes. The closed-loop sequence of label switched paths is established by the member nodes as each member node connects to its neighbours on the virtual ring. The virtual ring may expand by adding member nodes and may contract by removing member nodes. A member node's position on the virtual ring may be established using a sortable value.

41 Claims, 11 Drawing Sheets

VIRTUAL PRIVATE NETWORKS WITHIN A PACKET NETWORK HAVING A MESH TOPOLOGY

FIELD OF THE INVENTION

This invention relates to packet-switched networks and, in particular, to virtual private networks within packet networks having a mesh topology.

BACKGROUND OF THE INVENTION

The evolution of computer networking has seen a trend towards greater use of packet-switched networks having a mesh topology. To some extent, networks having a ring topology have begun to fall out of favour. Nevertheless, the ring topology provides certain attractive benefits, including resiliency and efficiency, that are not necessarily present in a mesh network.

In the interests of privacy and confidentiality it is sometimes desirable to establish an Ethernet virtual private network (VPN) over a packet-switched mesh network. A known approach for establishing Ethernet over a packet-switched mesh network includes tunneling each node to each other node, creating an $N^2$ mesh of tunnels. Other approaches include the "Martini" architecture or the RFC2547 architecture. These latter approaches are complex, hard to scale, and fail to adequately address resiliency and broadcast problems.

Accordingly, there remains a need for a method of establishing a flexible VPN in a mesh network that addresses some of the shortcomings of known solutions.

SUMMARY OF THE INVENTION

The present invention provides for the creation and management of a flexible virtual private network within a packet network having a mesh topology. The virtual private network may expand or contract dynamically by adding or dropping member nodes and dynamically re-determining its topology. The present invention employs label switched paths to create flexible virtual private networks within a mesh network.

In one aspect, the present invention provides a method of forming a virtual private network within a mesh network of nodes, the virtual private network includes member nodes selected from the network of nodes. The method includes the steps of distributing a membership message to the member nodes, the membership message including a VPN identifier; at each member node, determining a topology for the virtual private network, wherein for each of the member nodes the topology identifies at least one adjacent member node; and creating label switched paths between the member nodes and their adjacent member nodes, thereby establishing the virtual private network having the topology.

In a further aspect, the present invention provides a computer program product having a computer-readable medium tangibly embodying computer executable instructions for creating a virtual private network within a mesh network of nodes, the virtual private network including member nodes selected from the network of nodes. The computer executable instructions include computer executable instructions for distributing a membership message to the member nodes, the membership message including a VPN identifier; computer executable instructions for determining, at each member node, a topology for the virtual private network, wherein for each of the member nodes the topology identifies at least one adjacent member node; and computer executable instructions for creating label switched paths between the member nodes and their adjacent member nodes, thereby establishing the virtual private network having the topology.

In yet a further aspect, the present invention provides a system for forming a virtual private network within a mesh network of nodes, the virtual private network including member nodes selected from the network of nodes. The system includes means for distributing a membership message to the member nodes, the membership message including a VPN identifier; means for determining a topology for the virtual private network, wherein for each of the member nodes the topology identifies at least one adjacent member node; and means for creating label switched paths between the member nodes and their adjacent member nodes, thereby establishing the virtual private network.

In another aspect, the present invention provides a system for forming a virtual private network within a mesh network of nodes. The system includes member nodes selected from the network of nodes, wherein the member nodes receive a membership message, the membership message including a VPN identifier, and wherein the member nodes include a topology module for determining a topology for the virtual private network, wherein for each of the member nodes the topology identifies at least one adjacent member node; and label switched paths between the member nodes and their adjacent member nodes, wherein the label switched paths establish the virtual private network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The following detailed description of specific embodiments of the present invention does not limit the implementation of the invention to any particular communications protocol or language. Any limitations presented herein as a result of a particular type of communications protocol or language are not intended as limitations of the present invention.

The following detailed description includes specific embodiments of the present invention which establish a VPN having a ring topology. The present invention is not limited to ring-based VPNs. It will be understood that other VPN topologies may be realized, including tree-based topologies, such as in the case of a switched Ethernet LAN.

Figure 1:
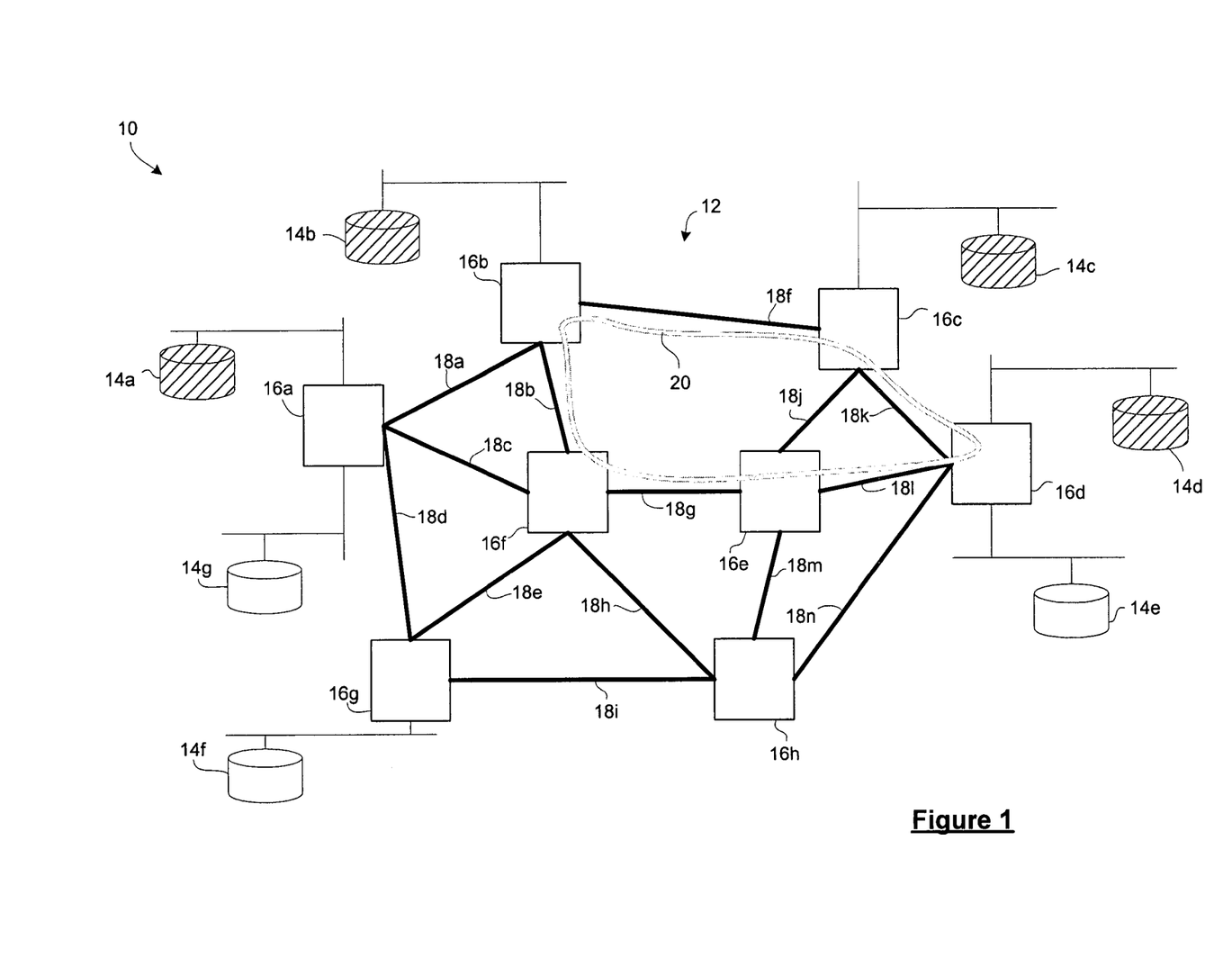
FIG. 1 shows in diagrammatic form a system having a closed-loop label switched path established within a mesh network.

Reference is first made to FIG. 1, which shows in diagrammatic form a system 10 that includes a mesh network 12 and a plurality of users 14 (shown individually as 14a, 14b, . . . , 14g). The mesh network 12 interconnects the users 14. The mesh network 12 includes a plurality of nodes 16 (shown individually as 16a, 16b, . . . , 16h) and a plurality of physical links 18 (shown individually as 18a, 18b, . . . , 18n). The physical links 18 interconnect the nodes 16 with each other. Each of the users 14 is connected to a node 16 so as to be coupled to the mesh network 12.

The users 14 are entities capable of network communications, such as, but not limited to, computers, servers, other networks. The nodes 16 are devices that manage the exchange of communications over the physical links 18 of the mesh network 12. The nodes 16 are label-switched capable devices, and may include, but are not limited to, routers, switches, etc.

In one embodiment, the nodes 16 are Multi-Protocol Label Switching/Generalized Multi-Protocol Label Switching (MPLS/GMPLS) capable devices. The mesh network 12 supports MPLS/GMPLS transport and protocols. The MPLS/GMPLS technology forwards packets of data using labels attached to each packet, without requiring intermediate nodes to look at the content of each packet. In an MPLS/GMPLS network, the IP addresses within a packet are not examined, allowing MPLS/GMPLS to encapsulate data in order to provide for private data traffic. The present invention is not limited to embodiments realized using MPLS/GMPLS transport and protocols and may be realized using other label switched protocols, including ASTN, OUNI, PNNI and others, as will be understood by those of ordinary skill in the art.

In an MPLS/GMPLS system, label switched paths (LSPs) can be established by defining a transition in label values across a set of label switched routers (LSRs). To set up an LSP, the appropriate label mappings are distributed to the appropriate LSRs through a path set-up protocol. The LSRs each maintain a forwarding table populated with entries tying an incoming interface and label value to an outgoing interface and label value. A variety of signalling protocols exist for distributing labels and for other signalling, including Border Gateway Protocol (BPG), RSVP, and others.

Referring still to FIG. 1, there is shown a closed-loop sequence of label switched paths 20. The closed-loop sequence of label switched paths 20 comprises a number of individual node 16 to node 16 LSPs established over the physical links 18b, 18f, 18k, 18l, and 18g.

The closed-loop sequence of label switched paths 20 establishes a virtual private network having a ring topology connecting users 14b, 14c, and 14d. Each of the nodes 16b, 16c, and 16d, in the closed-loop sequence of label switched paths 20 is a member node. The closed-loop sequence of label switched paths 20 passes through intermediate nodes 16d and 16f between member nodes 16b and 16d. The VPN with a ring topology may be referred to herein as a virtual ring.

The users 14b, 14c, and 14d, may use the virtual ring to communicate with other users on the ring. The ring provides certain ring-based advantages to the users 14b, 14c, and 14d, including resiliency and quality of service improvements and broadcast capabilities.

Figure 2:
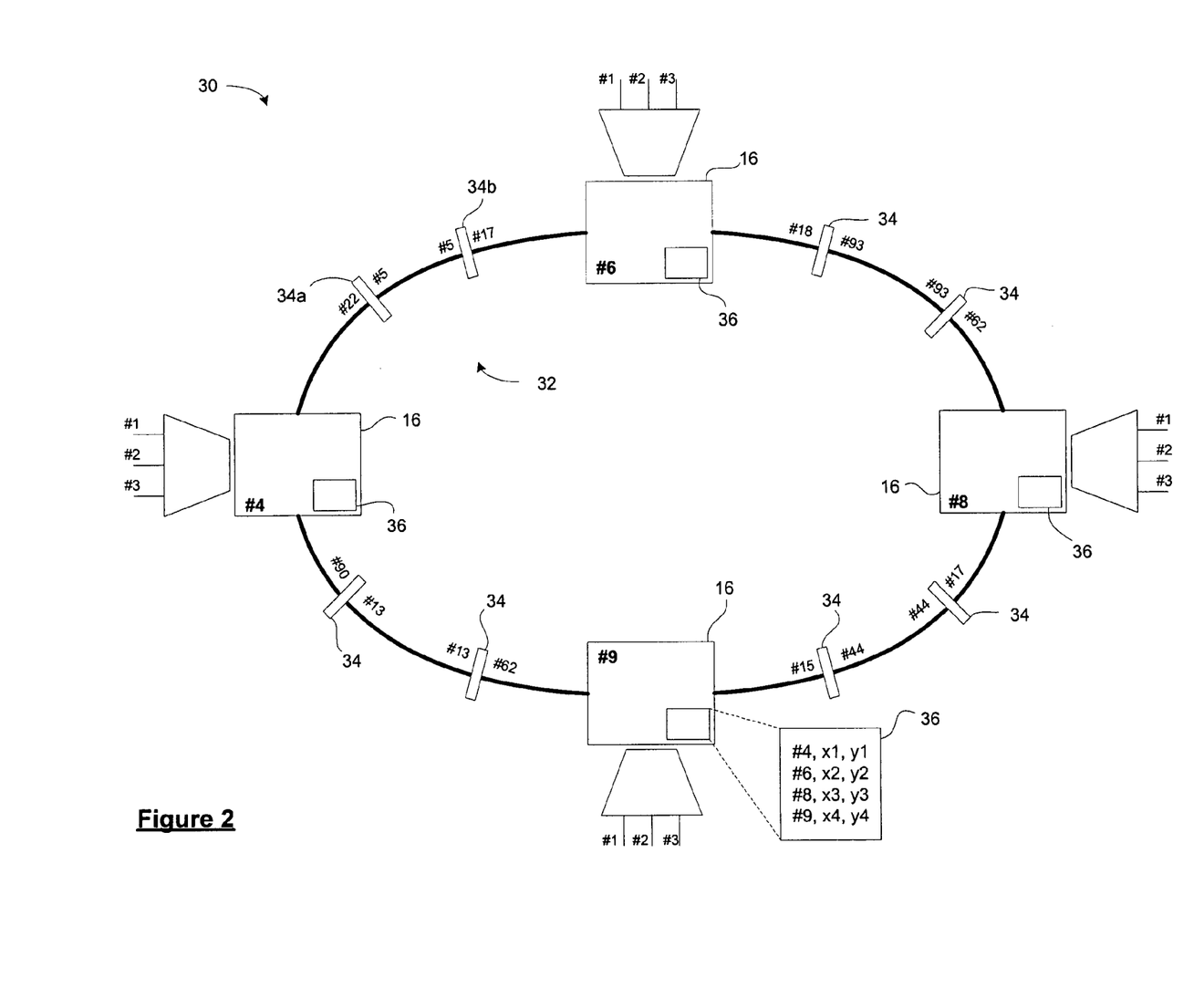
FIG. 2 shows in diagrammatic form a virtual ring, according to the present invention.

Reference is now made to FIG. 2, which shows in diagrammatic form a virtual ring 30, according to the present invention. The virtual ring 30 includes four member nodes 16 (FIG. 1) and a closed-loop sequence of LSPs 32 interconnecting the four member nodes 16 in a closed loop. Each of the four member nodes 16 has a unique label identifier, namely #4, #6, #8, and #9. These labels are used to refer to a specific one of the four member nodes 16.

The member nodes 16 each maintain a forwarding table 36 populated by data identifying the other member nodes 16 and any information required to forward data to each other member node 16. For example, a forwarding table 36 may specify the "cost" associated with forwarding data to a particular member node 16 in each direction around the ring, i.e. a cost x for clockwise and a cost y for counterclockwise.

The closed-loop sequence of LSPs 32 passes through various intermediate nodes 34 between pairs of the four member nodes 16. Each intermediate node 34 shown in FIG. 2 identifies a pair of labels corresponding to input and output labels. For example, traffic entering the closed-loop sequence of LSPs 32 at member node 16 label #4 and traveling clockwise towards member node 16 label #6 encounters a first intermediate node 34a where the label #22 is swapped for the label #5. At a second intermediate node 34b the label #5 is swapped for the label #17.

Routing on the closed-loop sequence of LSPs 32 employs a two level label stack. The first or top level of the stack is the tunnel label, i.e. the label for the hop being traversed on the closed-loop sequence of LSPs 32. The second level is the exit member node 16 label. In some cases, it is necessary to employ a three level label stack so as to differentiate between different networks that are interconnected via the closed-loop sequence of LSPs 32. In such a case, the third level is the network differentiator.

Figure 3:
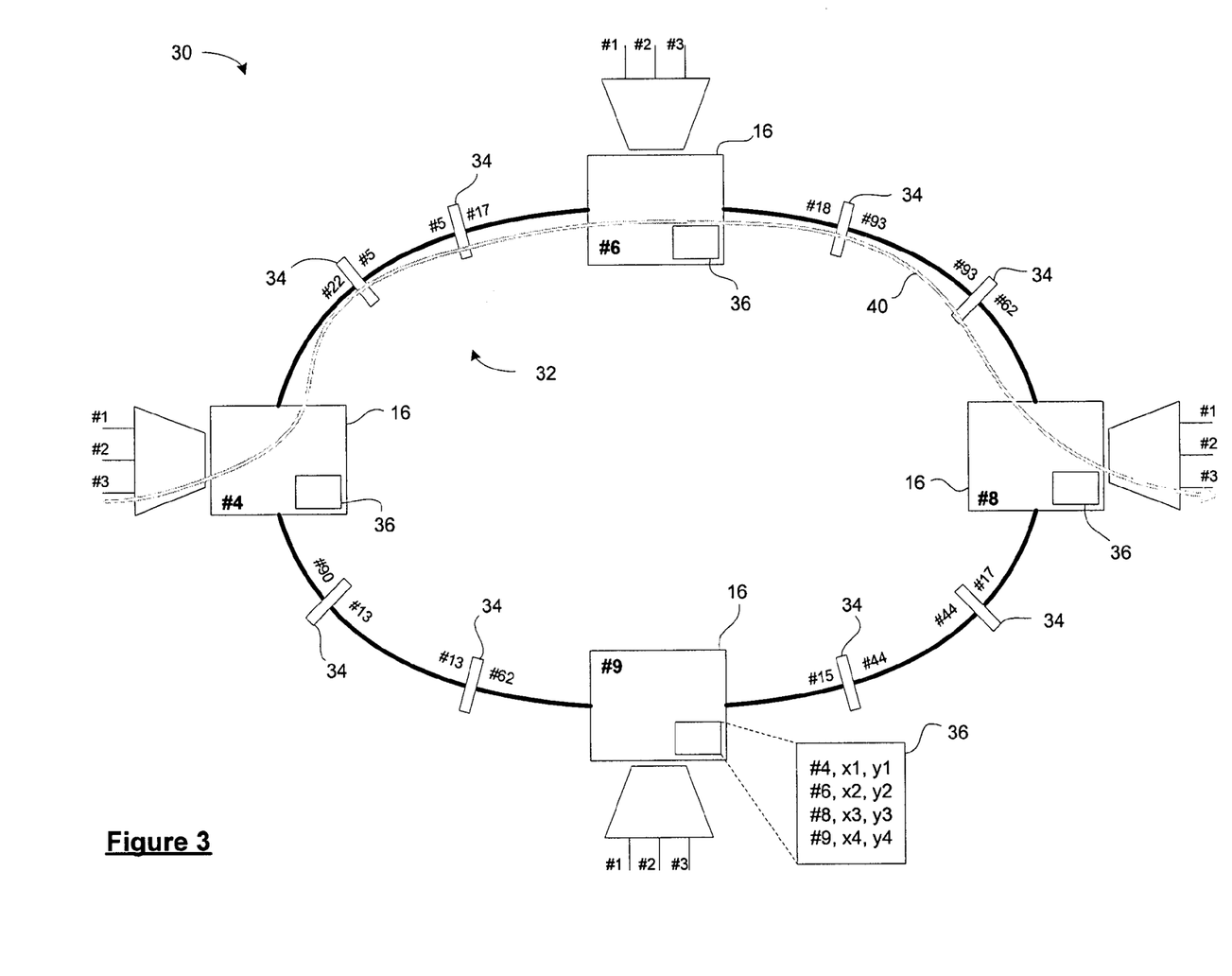
FIG. 3 shows the virtual ring of FIG. 2 employed for point to point communication.

Reference is now made to FIG. 3, which shows the virtual ring 30 of FIG. 2 employed for point to point communication. The virtual ring 30 is shared between multiple VPNs (labels #1, #2, and #3). A packet of data may be sent from a particular ingress member node 16, such as member node 16 label #4, to a particular egress member node 16, such as member node 16 label #8 using the three level label stack. For example, a node-to-node communication 40 from label #4 to label #8 is accomplished using a label stack having the form: [#22, #8, #3][data]. In the label stack, the top label #22 identifies the label of the LSP segment or tunnel for the first hop of the closed-loop sequence of LSPs 32; the second label, #8, identifies member node 16 label #8 as the egress point; and the third label, #3, specifies that the packet relates to VPN number 3.

Figure 4:
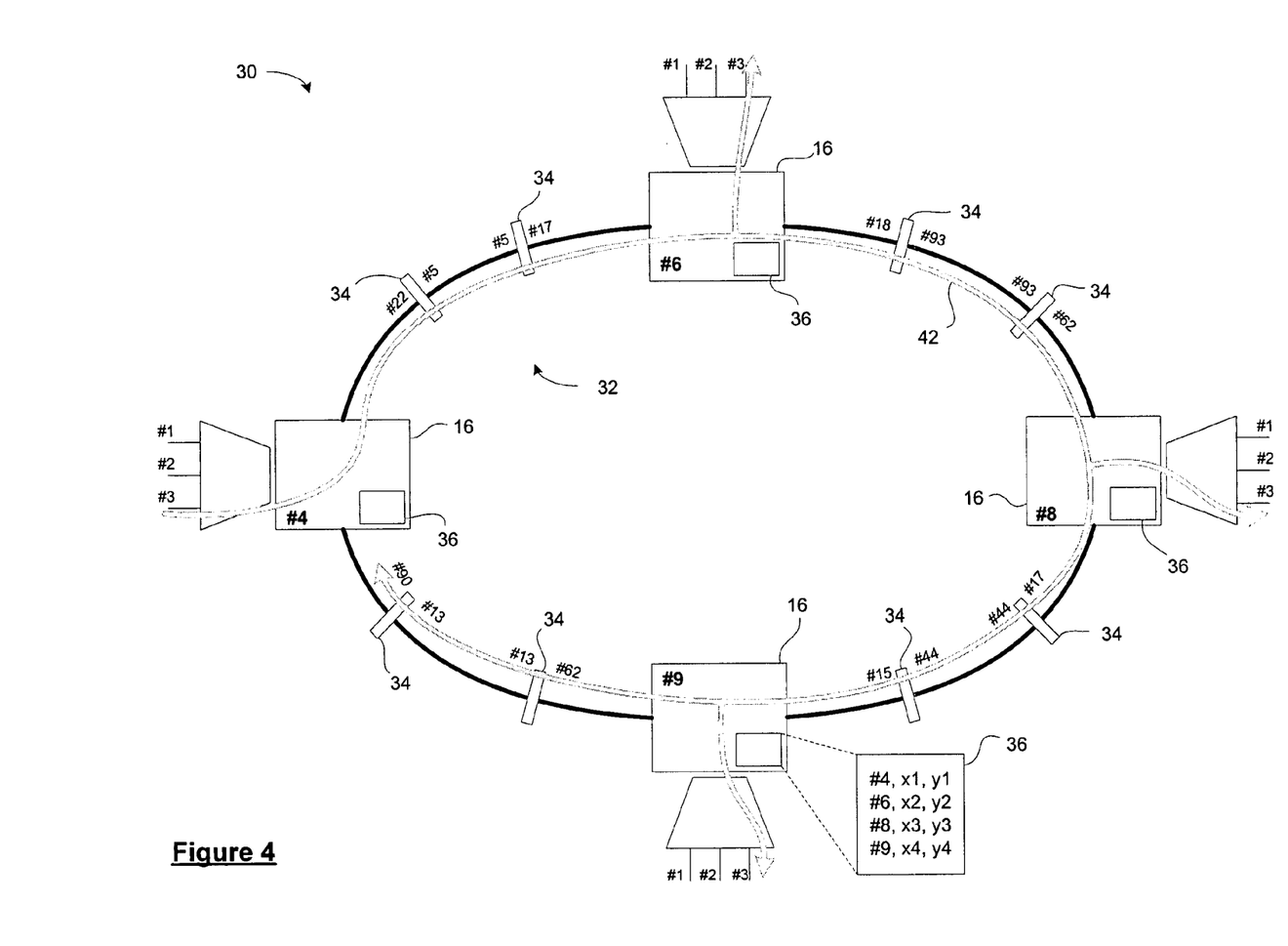
FIG. 4 shows the virtual ring of FIG. 2 employed for broadcast communication.

Reference is next made to FIG. 4, which shows the virtual ring 30 of FIG. 2 employed for broadcast communication. A packet of data is sent from a particular ingress member node 16, such as member node 16 label #4 to all member nodes 16, using the three level label stack. A broadcast communication 42 employs a label stack having the form: [#22, *, #3][data]. In the label stack, the second label, *, is a wildcard indicating that all member nodes 16 are egress points, meaning that every member node 16 on the ring (other than originating member node 16 label #4) receives a copy of the packet and also forwards it along the closed-loop sequence of LSPs 32 to the next member node 16.

Figure 5:
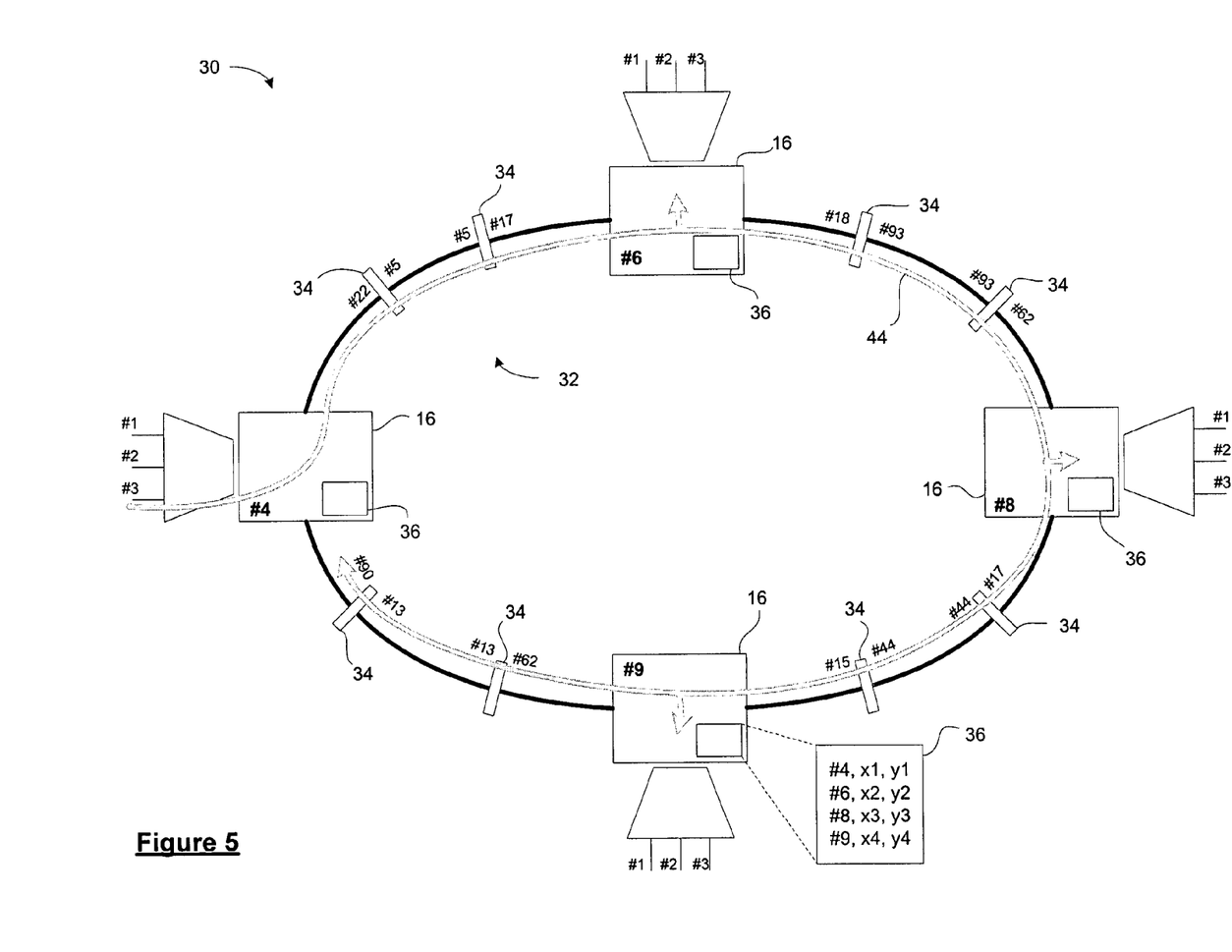
FIG. 5 shows the virtual ring of FIG. 2 employed for distributing control information.

Reference is now made to FIG. 5, which shows the virtual ring 30 of FIG. 2 employed for distributing control information. Instead of broadcasting data, as depicted in FIG. 4, the closed-loop sequence of LSPs 32 may be used to send a control message 44. In this case, the label stack takes the form: [#22, #0][data]. The second level label of #0 indicates that the message is a control message. If the control message was directed at only one member node 16, such as label #8, then the label stack would take the form: [#22, #8, #0][data]. In this case the label #0 appears at the third level since the egress member node 16 label #8 is required at the second level.

Figure 6:
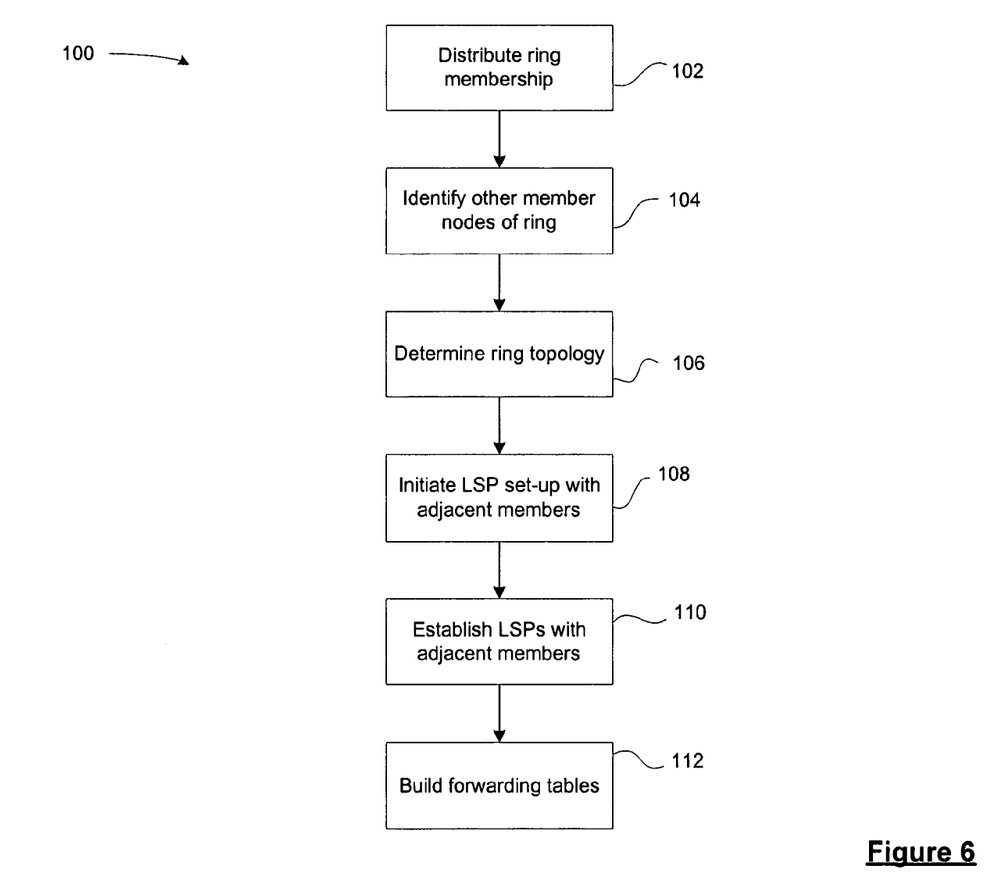
FIG. 6 shows, in flowchart form, a method of creating a virtual ring within a mesh network, according to the present invention.

Reference is now made to FIG. 6, which shows, in flowchart form, a method 100 of creating a virtual ring within a mesh network, according to the present invention. The mesh network includes a plurality of MPLS/GMPLS capable nodes interconnected by a variety of physical links. Users are connected to some of the nodes.

The method begins in step 102 with the distribution of ring membership to those nodes that are to become members of the virtual ring. This may be done using a variety of MPLS signalling protocols, such as I-BGP. In one embodiment, each of the member nodes receives a control message containing data of, or similar to, the following form:

<RouterID>, <RingID>, <relativeposition> where <RouterID> is the IP address of the member node, <RingID> is a variable length octet string identifying the virtual ring, and <relativeposition> is a floating point number. In one embodiment, <relativepostion> is an ordinal indicating where on the virtual ring the member node is positioned relative to other member nodes. The computation of the order of nodes on the ring is not scalable and the optimal order can change with time. Therefore, the administrator establishing the virtual ring provides an order by specifying an ordinal for each member node. The ordinal tells a member node that it will be adjacent to the next larger and next smaller number, using modulo arithmetic. The administrator chooses the ordinal, i.e. the relative position of nodes on the ring, but does not choose the routing. In other embodiments, <relativePosition> is some other sortable value, such as a number or a letter.

The distribution of ring membership need not include relative position information. If relative position information is not included in the membership message, then the nodes will not have pre-assigned neighbours and they will need to determine their neighbours using a suitable algorithm. For example, they could determine their neighbours on the basis of minimizing the cost associated with the LSPs, i.e. minimizing the circumference of the ring.

Following the distribution of ring membership, each member node selects a unique label for itself and attempts to identify the other member nodes on the virtual ring in step 104. The label may be selected randomly by each member node and a collision/de-clashing mechanism may be required to prevent any duplication of labels. Each member node seeks both the other member nodes' identities and their ordinals, if ordinals have been distributed. In one embodiment, each member node queries the BGP database for a list of other member nodes based upon the <RingID>. In response, each member node receives a list of the member nodes and their <relativeposition> ordinals.

In step 106, each member node computes a ring topology based upon the ordinals received in step 104. If ordinals have not been distributed, then each member node determines the ring topology based upon the applicable topology algorithm, i.e. minimizing cost of LSPs, and associated data gathered, i.e. regarding the cost of various routes between nodes. The ring topology tells the member node what the ring should look like from its perspective. In particular, the topology tells each member node which two member nodes are on either side of it.

In step 108, the member nodes initiate LSP set up with their adjacent member nodes to establish the closed-loop sequence of LSPs. In one embodiment, each member node sends an LSP set-up message to one of its adjacent member nodes; for example, the member node having the next highest ordinal, i.e. JOIN messages are sent clockwise around the ring. In another embodiment, each member node sends JOIN messages to the two member nodes on either side of it. To prevent the establishment of two LSP segments between a pair of nodes, the member nodes may send a JOIN message to an adjacent member node only if they have not yet received a corresponding JOIN message from that member node. In step 110, the member nodes receiving LSP set-up messages respond appropriately according to the signalling protocol employed in the set-up in order to establish the LSP segment between adjacent nodes. With an LSP segment established between each pair of adjacent member nodes on the virtual ring, a closed-loop sequence of LSPs emerges within the mesh network.

Once the closed-loop sequence of LSPs is established, the member nodes each build a forwarding table in step 112. To build the forwarding table the member nodes may, for example, send control messages around the ring gathering information about the other member nodes, including the "cost" associated with transmission across each LSP segment. The cost is a value that signifies the relative cost of using a particular LSP segment as compared to other LSP segments. It is the sum of the costs of the individual links that make up an LSP's cost and is based upon any number of factors, such as for example distance and bandwidth. A control message propagates around the ring gathering information until it returns to the sending member node where the information is extracted and used to populate the forwarding table at that member node.

Figure 7:
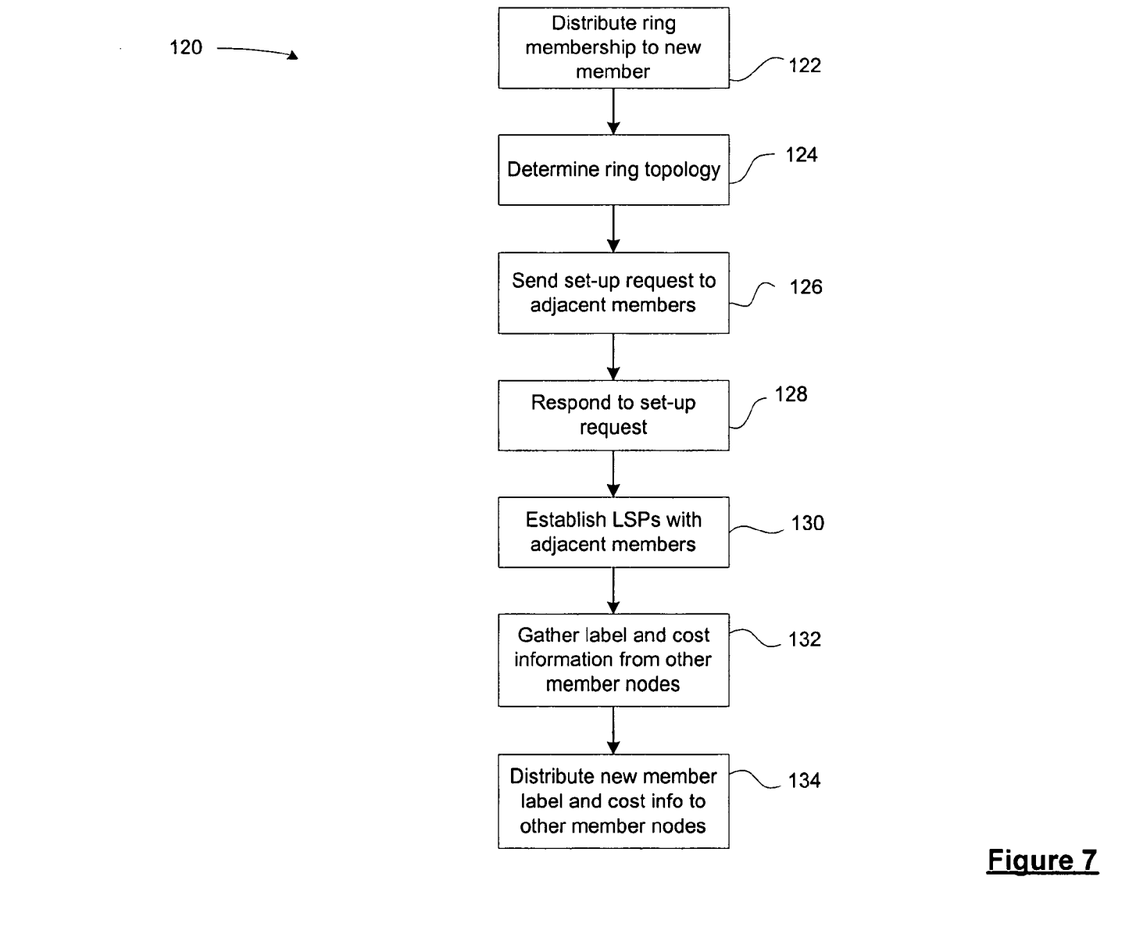
FIG. 7 shows, in flowchart form, a method of adding a new member node to a virtual ring.

Reference is now made to FIG. 7, which shows, in flowchart form, a method 120 of adding a new member node to a virtual ring. The method 120 is described below in conjunction with FIGS. 8 to 11, which illustrate diagrammatically the progression of steps of the method 120 (FIG. 7) for the closed-loop sequence of label switched paths 20 of FIG. 1. As will be seen in FIGS. 8 through 11, the closed-loop sequence of label switched paths 20 includes existing member nodes 16b, 16c, and 16d, and new member node 16a.

The method 120 begins in step 122 with the distribution of membership to the new member node 16a. As with the method 100 (FIG. 6) of creating the virtual ring, this may be done using a variety of MPLS/GMPLS signalling protocols, such as I-BGP. In one embodiment, the new member node 16a receives a control message containing data of, or similar to, to the following form:

<RouterID>, <RingID>, <relativeposition> where <RouterID> is the IP address of the new member node, <RingID> is a variable length octet string identifying the virtual ring, and <relativeposition> is the floating point number that identifies the new member node's relative position on the ring. The new member node 16a may query a database for the virtual ring, such as a distributed BGP database, to determine the identities of the existing member nodes 16*b*, 16*c*, and 16*d* and their ordinals.

The existing member nodes 16*b*, 16*c*, and 16*d* are also notified that the new member node 16*a* is to be added to the virtual ring. This notification may take place by virtue of a regular update of ring membership, such as for example through updates to a distributed database of ring members, like with the I-BGP signalling protocol. Other methods of notifying existing member nodes 16*b*, 16*c*, and 16*d* may be used.

In step 124, the ring topology is calculated. The new member node 16*a* determines the ring topology based upon the ordinal values of each member node 16*a*, 16*b*, 16*c*, and 16*d*. It thereby determines which two existing member nodes are its adjacent nodes 16*b* and 16*d*. Similarly, the existing member nodes 16*b*, 16*c*, and 16*d* determine where the new member node 16*a* fits within the virtual ring.

Figure 8:
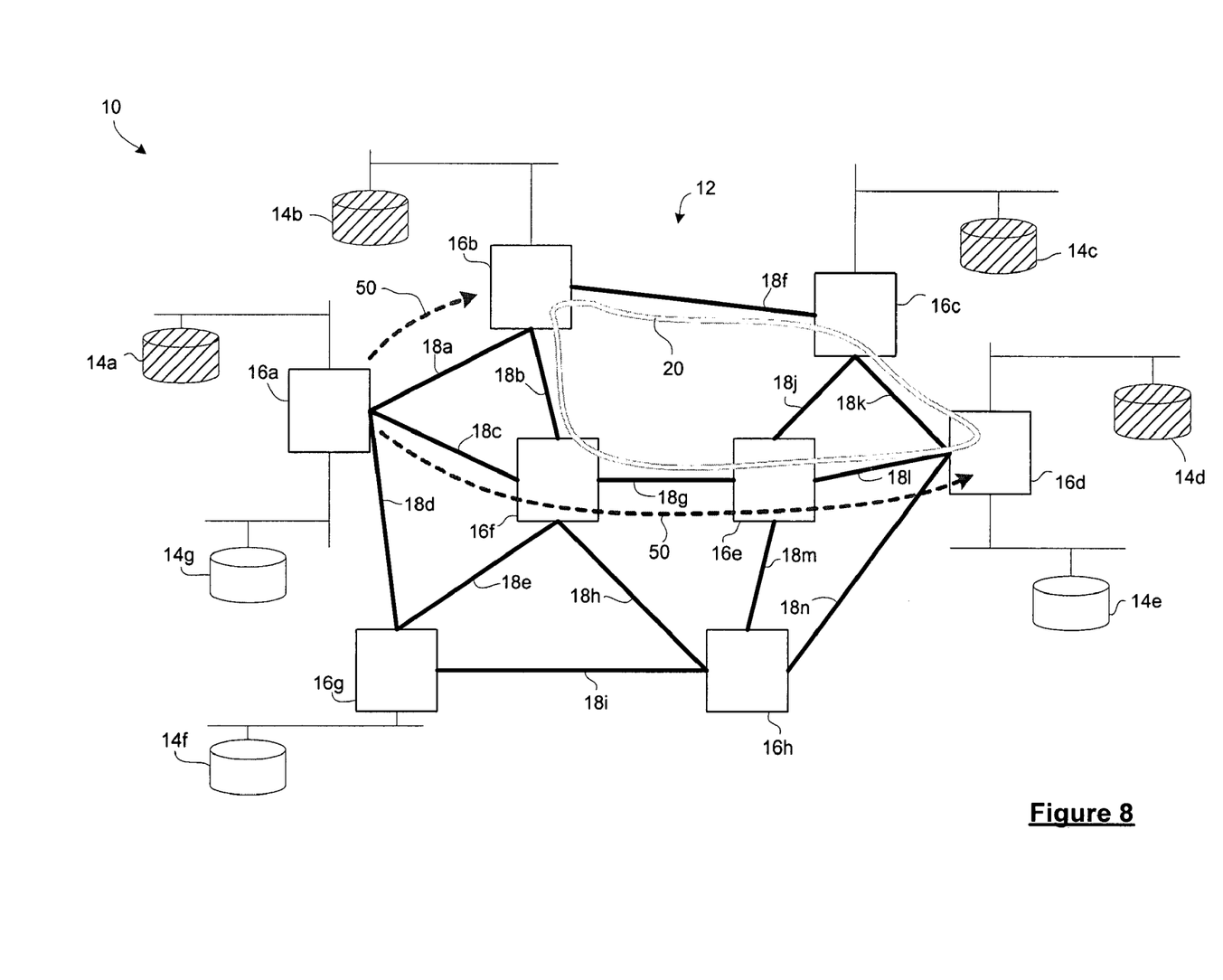
FIG. 8 shows, in diagrammatic form, a step in the method of adding a new member node to a virtual ring.
Figure 9:
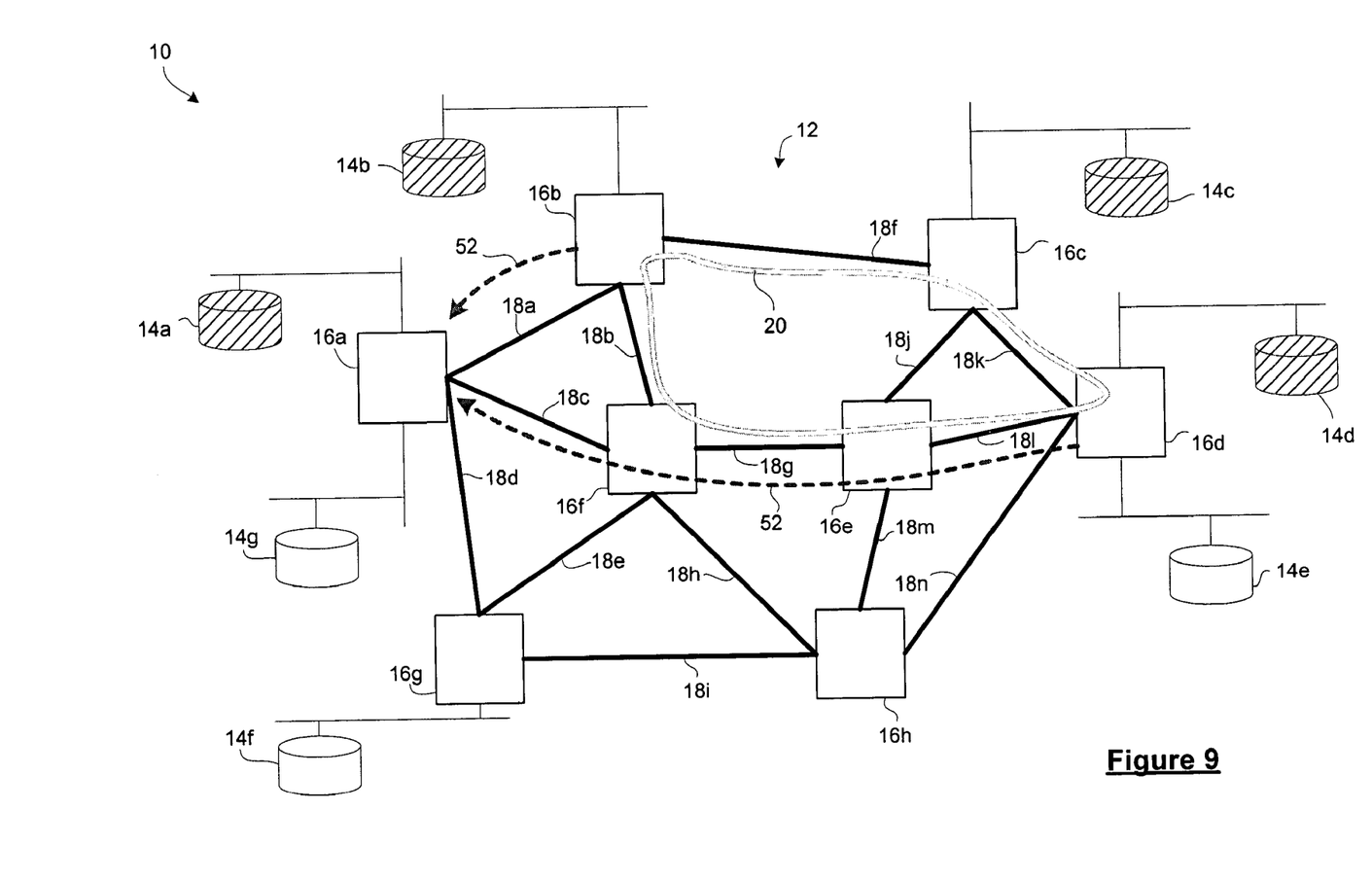
FIG. 9 shows, in diagrammatic form, a further step in the method of adding a new member node to a virtual ring.

In step 126, and as shown in FIG. 8, the new member node 16*a* sends a set-up message 50 to its two adjacent member nodes 16*b* and 16*d*. In step 128, the two adjacent member nodes 16*b* and 16*d* send a response message 52 to the new member node 16*a* acknowledging the set-up request, as shown in FIG. 9. For example, if the signalling protocol used is RSVP-TE, the new member node 16*a* may send a PATH message to each adjacent member node 16*b* and 16*d* which will respond with RESV messages. The new member node 16*a* will not be spliced in yet, but any data received over these new segments will be forwarded appropriately.

Figure 10:
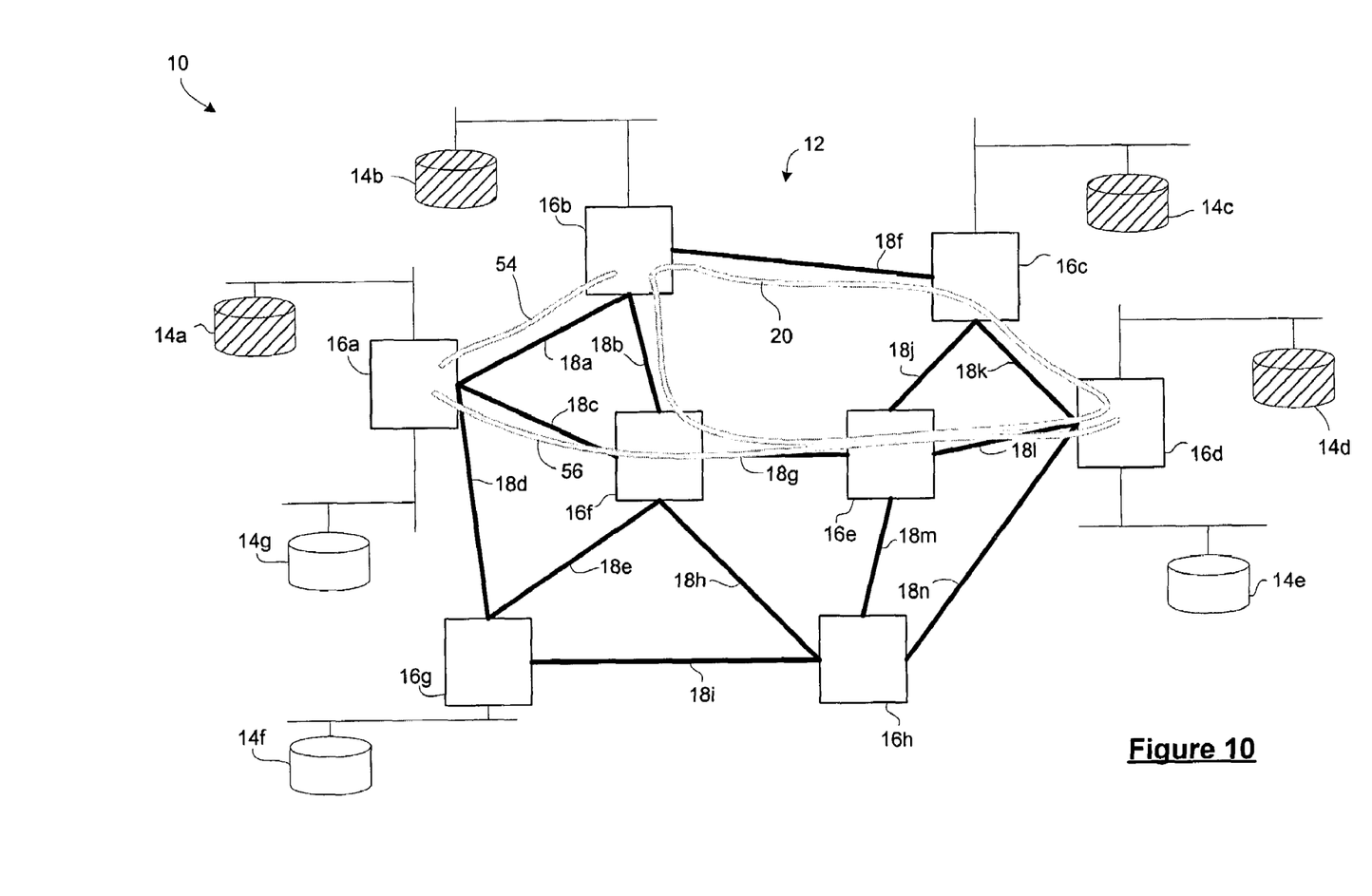
FIG. 10 shows, in diagrammatic form, yet a further step in the method of adding a new member node to a virtual ring.

Once the new member node 16*a* has received both responses 52 from the adjacent member nodes 16*b* and 16*d*, then in step 130 LSP segments 54 and 56 between the new member node 16*a* and its two adjacent member nodes 16*b* and 16*d*, respectively, are established, as shown in FIG. 10. If the signalling protocol used is RSVP-TE, this step may involve sending PATH refresh message with a special "splice", indication or subcode to the two adjacent member nodes 16*b* and 16*d* and the execution of the splice operation by those adjacent member nodes 16*b* and 16*d* to establish the LSPs 54 and 56 to the new member node 16*a*. The old LSP segment between the two adjacent member nodes 16*b* and 16*d* is still in place.

Figure 11:
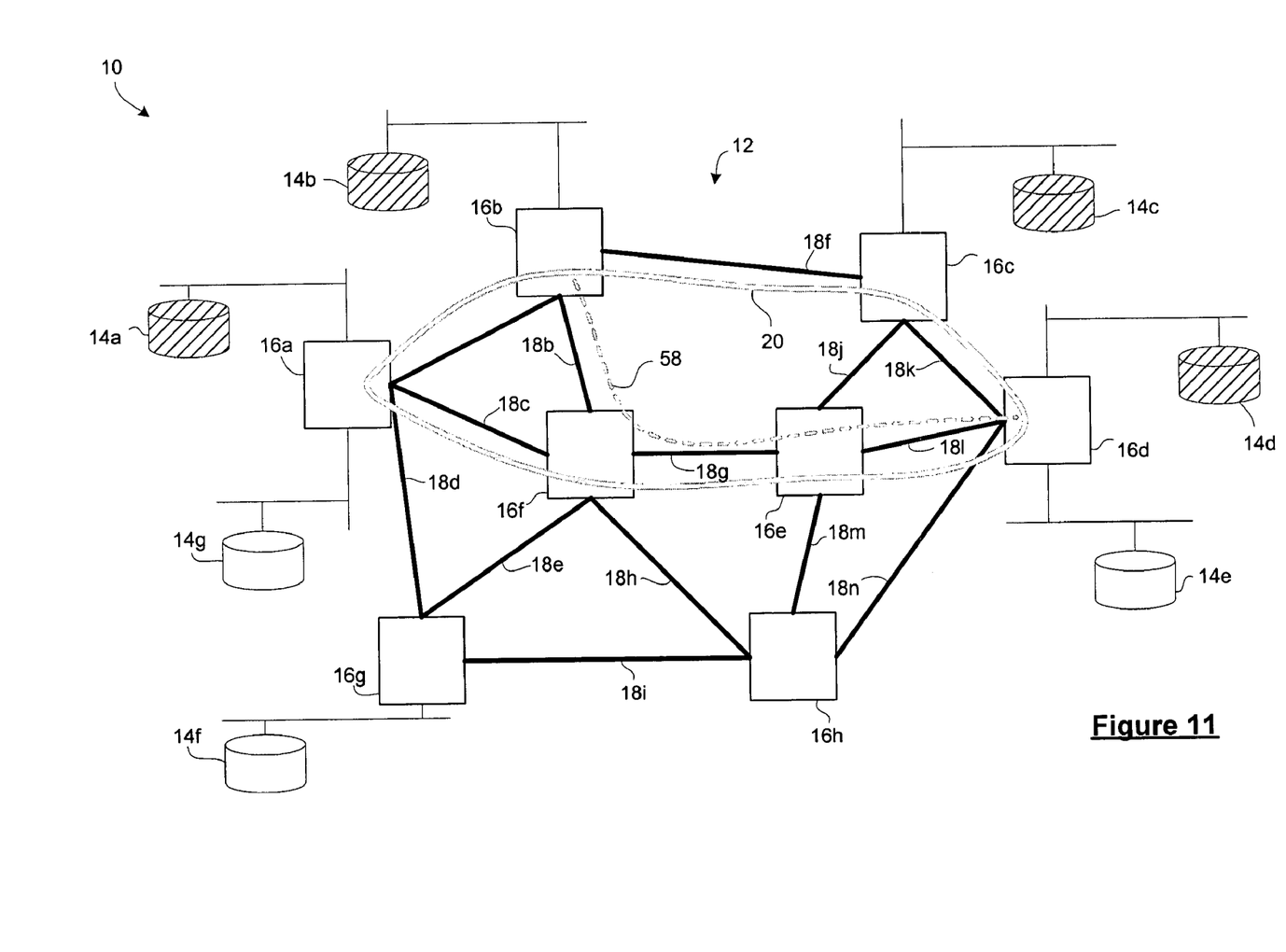
FIG. 11 shows, in diagrammatic form, another step in the method of adding a new member node to a virtual ring.

Once the new member node 16*a* has confirmed that the LSP segments 54 and 56 with its two adjacent member nodes 16*b* and 16*d* have successfully been established, it sends a clean-up message to them. In step 132, upon receipt of the clean-up message, the two adjacent member nodes 16*b* and 16*d* drop the old LSP segment 58 between them, as shown in FIG. 11. At this point, the closed-loop sequence of label switched paths 20 has now been enlarged to splice in the new member node 16*a*. Steps 126 through 132 implement a "make-before-break" principle to minimize packet loss during ring contraction and expansion.

In step 134, the new member node 16*a* sends a control message around the ring gathering information regarding the identity of the other members and the costs associated with the LSPs between them. Once this information is received, it is used by the new member node 16*a* to populate its forwarding table and to select an appropriate unique label for itself. Then, in step 136, the new member node 16*a* sends another control message having the complete member information, including costs and labels, around the ring to allow other member nodes 16*b*, 16*c*, and 16*d* to update their own forwarding tables with the new information. In one embodiment, where the CR-LDP signalling protocol is used, the control messages are a QUERY-LABELS message and other hop by hop control messages, respectively.

It will be understood from the foregoing description that the make-before-break principle is also used in managing the removal of a member node from the virtual ring. For example, if a member node were to be removed from the ring, the two members adjacent the departing member node would recognize that they need to establish a direct LSP segment between them. Accordingly, the two adjacent members would set-up a new LSP segment and, once established, collapse the LSP segments with the departing member, thereby removing it from the virtual ring.

The virtual rings created within packet networks having mesh topology may be connected together to achieve a greater reach while maintaining a reasonable diameter. A possible application of the virtual rings includes connecting true resilient packet rings (RPR) over an MPLS/GMPLS wide area network (WAN). The virtual rings would thereby extend the resiliency and fairness characteristics of the RPRs into the WAN.

It will be understood by those of ordinary skill in the art that the virtual rings may be used in a hierarchical fashion. For example, a first rings may have a segment that traverses segments of a second ring. The rings are thus nested at the intersection and the third level label on the inner ring is actually used as the first level label on the outer ring.

Although the above description at times refers to particular signalling protocols, such as BGP, it will be understood that the present invention is not limited to a particular label switched signalling protocol.

It will also be understood that the present invention is not limited to ring topologies, but is applicable to tree-and-branch and other topologies of virtual private networks. Those of ordinary skill in the art will appreciate that with alternative topologies, like a tree-and-branch architecture, alternative methods are used to dynamically determine the topology of the VPN at each of the member nodes.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of forming a virtual private network within a mesh network of nodes, the virtual private network including member nodes selected from the network of nodes, the method comprising:

distributing a membership message to the member nodes, said membership message including a VPN identifier;

at each member node, determining a topology for the virtual private network, wherein for each of the member nodes said topology identifies at least one adjacent member node;

creating label switched paths between the member nodes and their adjacent member nodes, thereby establishing the virtual private network having said topology; and providing a signalling protocol on said label switched paths having a multi-level label stack, wherein said multi-level label stack includes a first layer label identifying a tunnel label and a second layer label identifying an egress member node label.

2. The method claimed in claim 1, wherein said step of creating label switched paths includes sending MPLS/GMPLS set-up control messaging.

3. The method claimed in claim 1, wherein said topology is a ring and wherein said step of creating label switched paths establishes a closed-loop sequence of label switched path.

4. The method claimed in claim 3, wherein said membership message includes relative position information, said relative position information specifying the position of the member node on said ring relative to the other member nodes.

5. The method claimed in claim 4, wherein said relative position information includes a sortable value, and wherein said step of determining said topology includes sorting said relative position information.

6. The method claimed in claim 5, wherein said relative position information includes an ordinal, and wherein said step of determining topology includes identifying two adjacent member nodes as the member node having the next highest ordinal and the member node having the next lowest ordinal.

7. The method claimed in claim 3, further including a step of adding a new member node, two of the member nodes being neighbour member nodes to said new member node on said ring, wherein said step of adding a new member node includes creating label switched path segments between said new member node and each of said neighbour member nodes before dropping a label switched path segment between said neighbour member nodes.

8. The method claimed in claim 3, further including a step of removing a selected member node, two of the member nodes being neighbour member nodes to said selected member node on said ring, wherein said step of removing includes creating a label switched path segment between said neighbour member nodes before dropping label switched paths between said selected node and each of said neighbour member nodes.

9. The method claimed in claim 1, further including a step of populating a forwarding table at the member nodes.

10. The method claimed in claim 1, wherein said multi-level label stack further includes a third layer label providing a network differentiator.

11. The method claimed in claim 1, further including a step of broadcasting a data packet from one of the member nodes to the other member nodes over the virtual private network.

12. A computer program product having a computer-readable medium tangibly embodying computer executable instructions for creating a virtual private network within a mesh network of nodes, the virtual private network including member nodes selected from the network of nodes, the computer executable instructions comprising:
  (a) computer executable instructions for distributing a membership message to the member nodes, said membership message including a VPN identifier;
  (b) computer executable instructions for determining, at each member node, a topology for the virtual private network, wherein for each of the member nodes said topology identifies at least one adjacent member node;
  (c) computer executable instructions for creating label switched paths between the member nodes and their adjacent member nodes, thereby establishing the virtual private network having said topology; and
  (d) computer executable instructions for providing a signalling protocol on said label switched paths having a multi-level label stack, wherein said multi-level label stack includes a first layer label identifying a tunnel label and a second layer label identifying an egress member node label.

13. The computer program product claimed in claim 12, wherein said computer executable instructions for creating label switched paths include computer executable instructions for sending MPLS/GMPLS set-up control messaging.

14. The computer program product claimed in claim 12, wherein said topology is a ring and wherein said computer executable instructions for creating label switched paths establish a closed-loop sequence of label switched paths.

15. The computer program product claimed in claim 14, wherein said membership message includes relative position information, said relative position information specifying the position of the member node on said ring relative to the other member nodes.

16. The computer program product claimed in claim 15, wherein said relative position information includes a sortable value, and wherein said computer executable instructions for determining said topology includes computer executable instructions for sorting said relative position information.

17. The computer program product claimed in claim 16, wherein said relative position information includes an ordinal, and wherein said computer executable instructions for determining topology include computer executable instructions for identifying two adjacent member nodes as the member node having the next highest ordinal and the member node having the next lowest ordinal.

18. The computer program product claimed in claim 14, further including computer executable instructions for adding a new member node, two of the member nodes being neighbour member nodes to said new member node on said ring, wherein said computer executable instructions for adding a new member node include computer executable instructions for creating label switched path segments between said new member node and each of said neighbour member nodes before dropping a label switched path segment between said neighbour member nodes.

19. The computer program product claimed in claim 14, further including computer executable instructions for removing a selected member node, two of the member nodes being neighbour member nodes to said selected member node on said ring, wherein said computer executable instructions for removing said selected member node include computer executable instructions for creating a label switched path segment between said neighbour member nodes before dropping label switched paths between said selected node and each of said neighbour member nodes.

20. The computer program product claimed in claim 12, further including computer executable instructions for populating a forwarding table at the member nodes.

21. The computer program product claimed in claim 12, wherein said multi-level label stack further includes a third layer label providing a network differentiator.

22. The computer program product claimed in claim 12, further including computer executable instructions for broadcasting a data packet from one of the member nodes to the other member nodes over the virtual private network.

23. A system for forming a virtual private network within a mesh network of nodes, the virtual private network including member nodes selected from the network of nodes, the system comprising:
  (a) means for distributing a membership message to the member nodes, said membership message including a VPN identifier;
  (b) means for determining a topology for the virtual private network, wherein for each of the member nodes said topology identifies at least one adjacent member node;

(c) means for creating label switched paths between the member nodes and their adjacent member nodes, thereby establishing the virtual private network; and (d) means for providing a signalling protocol on said label switched paths having a multi-level label stack, wherein said multi-level label stack includes a first layer label identifying a tunnel label and a second layer label identifying an egress member node label.

24. The system claimed in claim 23, wherein said means for creating label switched paths includes means for sending control messaging based upon a protocol selected from the group including MPLS, GMPLS, ASTN, OUNI, and PNNI.

25. The system claimed in claim 23, wherein said topology is a ring and wherein said means for creating label switched paths establishes a closed-loop sequence of label switched paths.

26. The system claimed in claim 25, wherein said membership message includes relative position information, said relative position information specifying the position of the member node on said ring relative to the other member nodes.

27. The system claimed in claim 26, wherein said relative position information includes a sortable value, and wherein said means for determining said topology includes means for sorting said relative position information.

28. The system claimed in claim 27, wherein said relative position information includes an ordinal, and wherein said means for determining a topology includes means for identifying two adjacent member nodes as the member node having the next highest ordinal and the member node having the next lowest ordinal.

29. The system claimed in claim 25, further including means for adding a new member node, two of the member nodes being neighbour member nodes to said new member node on said ring, wherein said means for adding a new member node includes means for creating label switched path segments between said new member node and each of said neighbour member nodes before dropping a label switched path segment between said neighbour member nodes.

30. The system claimed in claim 25, further including means for removing a selected member node, two of the member nodes being neighbour member nodes to said selected member node on said ring, wherein said means for removing includes means for creating a label switched path segment between said neighbour member nodes before dropping label switched paths between said selected node and each of said neighbour member nodes.

31. The system claimed in claim 23, further including a means for populating a forwarding table at the member nodes.

32. The system claimed in claim 23, wherein said multi-level label stack further includes a third layer label providing a network differentiator.

33. The system claimed in claim 23, further including means for broadcasting a data packet from one of the member nodes to the other member nodes over the virtual private network.

34. A system for forming a virtual private network within a mesh network of nodes, the system comprising:

member nodes selected from the network of nodes, wherein said member nodes receive a membership message, said membership message including a VPN identifier, and wherein said member nodes include a topology module for determining a topology for the virtual private network, wherein for each of said member nodes said topology identifies at least one adjacent member node; and label switched paths between said member nodes and their adjacent member nodes, wherein said label switched paths establish the virtual private network; and wherein said multi-level label stack includes a first layer label identifying a tunnel label and a second layer label identifying an egress member node label, and wherein said multi-level label stack includes a first layer label identifying a tunnel label and a second layer label identifying an egress member node label.

35. The system claimed in claim 34, wherein said topology is a ring and wherein said label switched paths form a closed-loop sequence of label switched paths.

36. The system claimed in claim 35, wherein said membership message includes relative position information, said relative position information specifying the position of the member node on said ring relative to the other member nodes.

37. The system claimed in claim 36, wherein said relative position information includes a sortable value, and wherein said topology module includes a sorting module for sorting said relative position information.

38. The system claimed in claim 37, wherein said relative position information includes an ordinal, and wherein said topology module identifies two adjacent member nodes as said member node having the next highest ordinal and said member node having the next lowest ordinal.

39. The system claimed in claim 34, wherein said member nodes include a forwarding table.

40. The system claimed in claim 34, wherein said multi-level label stack further includes a third layer label providing a network differentiator.

41. The system claimed in claim 34, wherein one of said member nodes broadcasts a data packet to the other said member nodes over the virtual private network.

* * * * *